(12) United States Patent
Tu (10) Patent No.: US 7,448,749 B2
(45) Date of Patent: Nov. 11, 2008

(54) EYEWEAR WITH TEMPORAL VENT

(75) Inventor: Aurelie C. Tu, Portland, OR (US)

(73) Assignee: Nike, Inc., Beaverton, OR (US)

( * ) Notice: Subject to any disclaimer, the term of this patent is extended or adjusted under 35 U.S.C. 154(b) by 0 days.

(21) Appl. No.: 11/331,314

(22) Filed: Jan. 11, 2006

(65) Prior Publication Data

US 2007/0159591 A1 Jul. 12, 2007

(51) Int. Cl.
*G02C 11/08* (2006.01)

(52) U.S. Cl. .................................. 351/62; 351/106

(58) Field of Classification Search .............. 351/41, 351/44, 62, 83–86, 103–110, 154; 2/435–437
See application file for complete search history.

(56) References Cited

U.S. PATENT DOCUMENTS

| | | |
|---|---|---|
| 2,362,725 A | 11/1944 | Slotsky |
| 2,397,243 A | 3/1946 | Cooper, Jr. |
| 2,444,498 A | 7/1948 | Cochran |
| D150,924 S | 9/1948 | Bright |
| 2,534,655 A | 12/1950 | Baratelli |
| 2,563,125 A | 8/1951 | Malcom, Jr. |
| 2,571,704 A | 10/1951 | Gilden |
| 2,607,919 A | 8/1952 | Stegeman |
| 2,770,606 A | 11/1956 | Moeller |
| 2,825,267 A | 3/1958 | Gagnon |
| D182,459 S | 4/1958 | Eisler |
| 3,066,573 A | 12/1962 | Moeller |
| 3,233,249 A | 2/1966 | Baratelli et al. |
| 3,517,393 A | 6/1970 | Beauchef |
| 3,756,704 A | 9/1973 | Marks |
| 3,838,914 A | 10/1974 | Fernandez |
| 4,240,718 A * | 12/1980 | Wichers ................. 351/62 |
| 4,317,240 A | 3/1982 | Angerman et al. |
| 4,674,851 A | 6/1987 | Jannard |
| D293,450 S | 12/1987 | Jannard |
| 4,730,915 A | 3/1988 | Jannard |
| 4,824,233 A | 4/1989 | Jannard |
| 4,951,322 A | 8/1990 | Lin |
| 4,964,714 A * | 10/1990 | Weymouth et al. ...... 351/62 |
| D324,394 S | 3/1992 | Jannard |
| 5,249,001 A | 9/1993 | Jannard |
| 5,387,949 A | 2/1995 | Tackles |
| 5,467,148 A | 11/1995 | Conway |
| 5,555,037 A | 9/1996 | Canavan |
| 5,576,775 A | 11/1996 | Bolle |
| 5,581,312 A | 12/1996 | Chen |

(Continued)

FOREIGN PATENT DOCUMENTS

| | | |
|---|---|---|
| IT | 01279258 | 12/1997 |
| IT | 01279337 | 12/1997 |
| IT | 00245516 | 3/2002 |
| IT | 01311533 | 3/2002 |
| WO | 0036453 | 6/2000 |

OTHER PUBLICATIONS www.rubensmenswear.com web site, Oakley Lenses, 1994.

*Primary Examiner*—Huy K Mai
(74) *Attorney, Agent, or Firm*—Banner & Witcoff, Ltd.

(57) ABSTRACT

Eyewear includes a frame, a left temple arm secured to the frame, and a right temple arm secured to the frame. At least one lens is connected to the frame. A first venting aperture is defined by the at least one lens and the frame and is located proximate the left temple arm. A second venting aperture is defined by the at least one lens and the frame and is located proximate the right temple arm. The at least one lens is free of any other apertures.

35 Claims, 9 Drawing Sheets

U.S. PATENT DOCUMENTS

| | | |
|---|---|---|
| 5,638,145 A * | 6/1997 | Jannard et al. ............... 351/62 |
| 5,661,536 A * | 8/1997 | Conway .................... 351/121 |
| 5,760,868 A | 6/1998 | Jannard et al. |
| 5,841,505 A | 11/1998 | Bolle |
| 5,969,787 A | 10/1999 | Hall et al. |
| 6,086,199 A | 7/2000 | Holland et al. |
| 6,196,681 B1 | 3/2001 | Canavan |
| 6,367,927 B2 | 4/2002 | Yang |
| 6,386,705 B1 | 5/2002 | Chen |
| 6,517,202 B2 | 2/2003 | Huang |
| 6,783,235 B1 * | 8/2004 | Lin ............................ 351/62 |
| 6,991,333 B2 | 1/2006 | Van Atta et al. |
| 7,147,321 B2 | 12/2006 | Van Atta |
| 2005/0179858 A1 | 8/2005 | Van Atta et al. |

* cited by examiner

EYEWEAR WITH TEMPORAL VENT

FIELD OF THE INVENTION

This invention relates generally to eyewear, and, in particular, to eyewear with temporal vents for improved ventilation.

BACKGROUND OF THE INVENTION

Eyewear is well known for use in many activities including athletic activities, such as biking, skiing, and running. The eyewear may have a multitude of constructions. For example, the eyewear may have a wraparound lens secured to a frame, commonly referred to as a shield lens, or it may have two distinct lenses secured to a frame. A common problem is that the eyewear can fog up due to the heat and perspiration generated by the user during athletic activities. Such fogging of the lenses negatively impacts the user's vision, reducing the user's comfort and possibly detrimentally affecting their performance.

It would be desirable to provide eyewear that reduces or overcomes some or all of the difficulties inherent in prior known devices. Particular objects and advantages of the invention will be apparent to those skilled in the art, that is, those who are knowledgeable or experienced in this field of technology, in view of the following disclosure of the invention and detailed description of certain preferred embodiments.

SUMMARY

The principles of the invention may be used to advantage to provide eyewear with a construction that provides improved ventilation. In accordance with a first aspect, eyewear includes a frame, a left temple arm secured to the frame, and a right temple arm secured to the frame. At least one lens is connected to the frame. A first venting aperture is defined by the at least one lens and the frame and is located proximate the left temple arm. A second venting aperture is defined by the at least one lens and the frame and is located proximate the right temple arm. The at least one lens is free of any other apertures.

In accordance with another aspect, eyewear includes a frame, a left temple arm secured to the frame, and a right temple arm secured to the frame. A left lens is connected to the frame with at least a portion of a peripheral edge of the left lens being free of the frame. A right lens is connected to the frame with at least a portion of a peripheral edge of the right lens being free of the frame. A first venting aperture is in the left lens proximate the left temple arm, and a second vent is in the right lens proximate the right temple arm.

In accordance with a further aspect, eyewear includes a frame, a left temple arm secured to the frame, and a right temple arm secured to the frame. A lens is connected to the frame with at least a portion of a peripheral edge of the lens being free of the frame. A first venting aperture is defined by the lens and the frame and is located proximate the left temple arm. A second venting aperture is defined by the lens and the frame and is located proximate the right temple arm. The lens is free of any other apertures.

In accordance with yet another aspect, eyewear includes a frame, a left temple arm pivotally secured to the frame, and a right temple arm pivotally secured to the frame. A left lens includes a first tab on a left side of the left lens and a second tab on the left side of the left lens that is spaced from the first tab, with a first recess in the left lens therebetween. A third tab is formed on the right side of the left lens. A first recess is formed in a left end of the frame, with the first tab of the left lens being removably received in the first recess in the frame. A second recess is formed in a left end of the frame, with the second tab of the left lens being removably received in the second recess in the frame, and a first venting aperture being defined by a combination of the first recess in the left lens, the first and second tabs of the left lens, and the frame. A third recess is formed in the frame, with the third tab of the left lens being removably received in the third recess in the frame. A right lens includes a first tab on a right side of the right lens and a second tab on the right side of the right lens that is spaced from the first tab and defines a second recess in the right lens therebetween. A third tab is formed on the left side of the right lens. A fourth recess is formed in a right end of the frame, with the first tab of the right lens being removably received in the fourth recess in the frame. A fifth recess is formed in a right end of the frame, with the second tab of the right lens being removably received in the fifth recess in the frame, and a second venting aperture being defined by a combination of the second recess in the right lens, the first and second tabs of the right lens, and the frame. A sixth recess is formed in the frame, with the third tab of the right lens being removably received in the sixth recess in the frame.

Substantial advantage is achieved by providing eyewear with vents. In particular, certain preferred embodiments of the present invention help prevent moisture buildup on the eyewear, thereby improving overall vision and enhancing comfort for the wearer. The vents may also provide aeration for the user's eyes, making the user's eyes more comfortable.

These and additional features and advantages of the invention disclosed here will be further understood from the following detailed disclosure of certain preferred embodiments.

The figures referred to above are not drawn necessarily to scale and should be understood to provide a representation of the invention, illustrative of the principles involved. Some features of the eyewear depicted in the drawings have been enlarged or distorted relative to others to facilitate explanation and understanding. The same reference numbers are used in the drawings for similar or identical components and features shown in various alternative embodiments. Eyewear as disclosed herein would have configurations and components determined, in part, by the intended application and environment in which they are used.

DETAILED DESCRIPTION OF CERTAIN PREFERRED EMBODIMENTS

Figure 1:
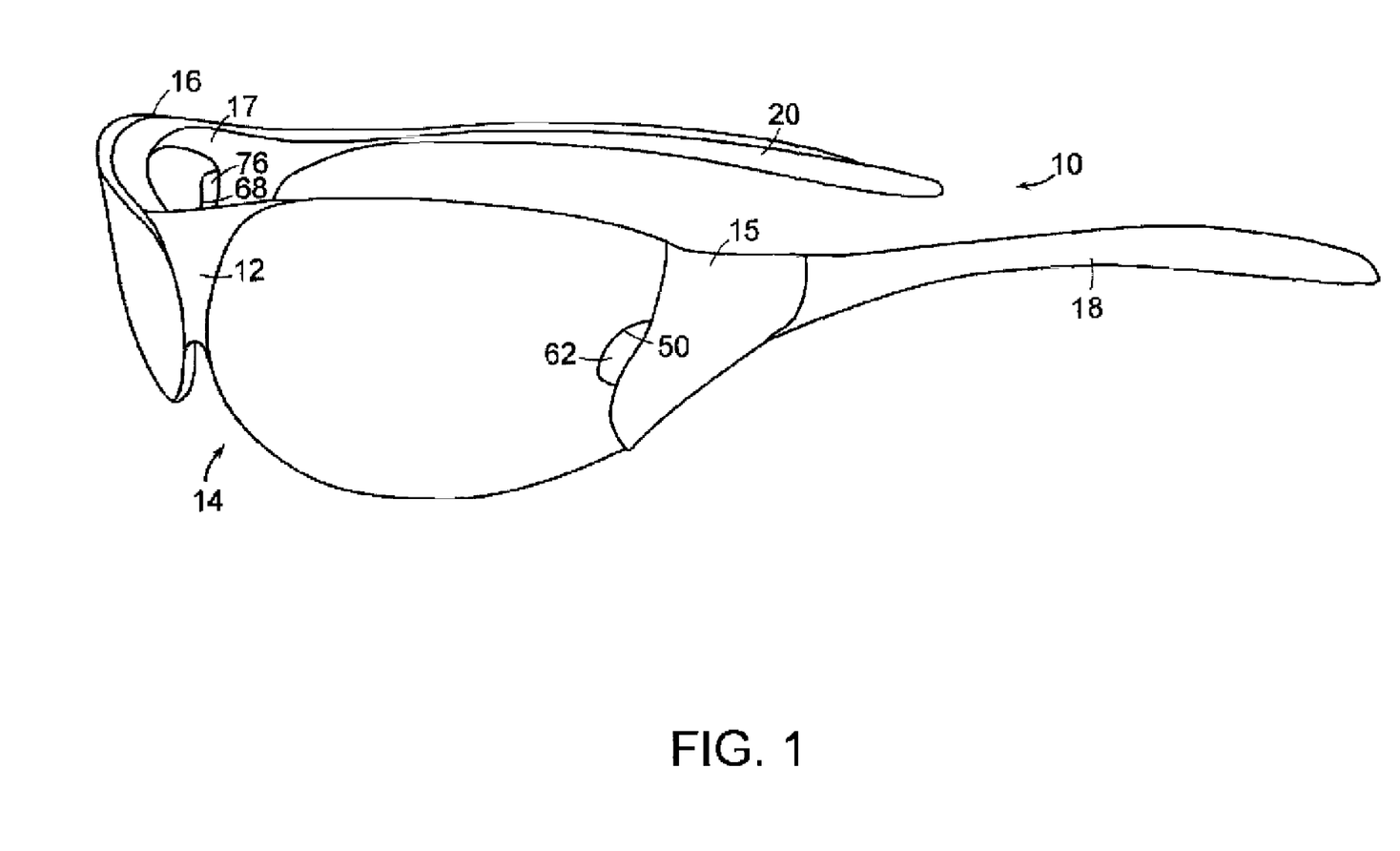
FIG. 1 is a perspective view of an embodiment of eyewear with vents.
Figure 2:
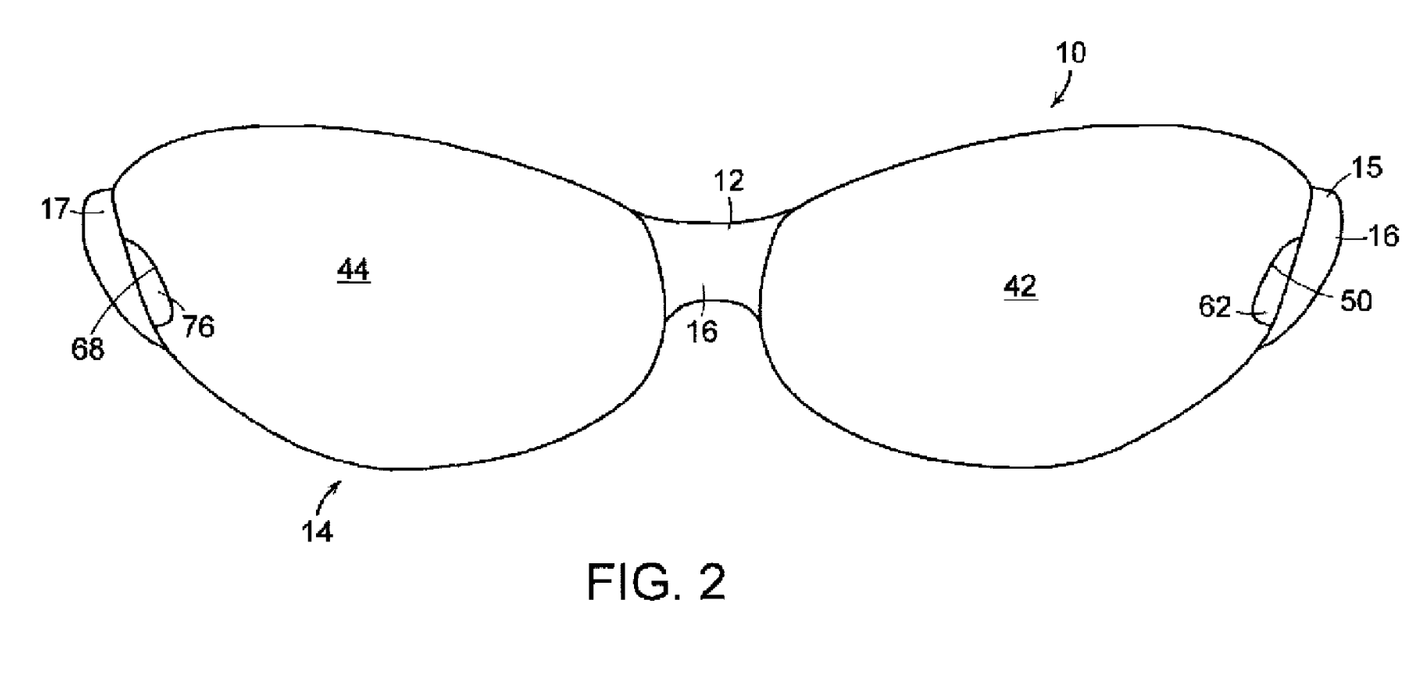
FIG. 2 is a front elevation view of the eyewear of FIG. 1.
Figure 3:
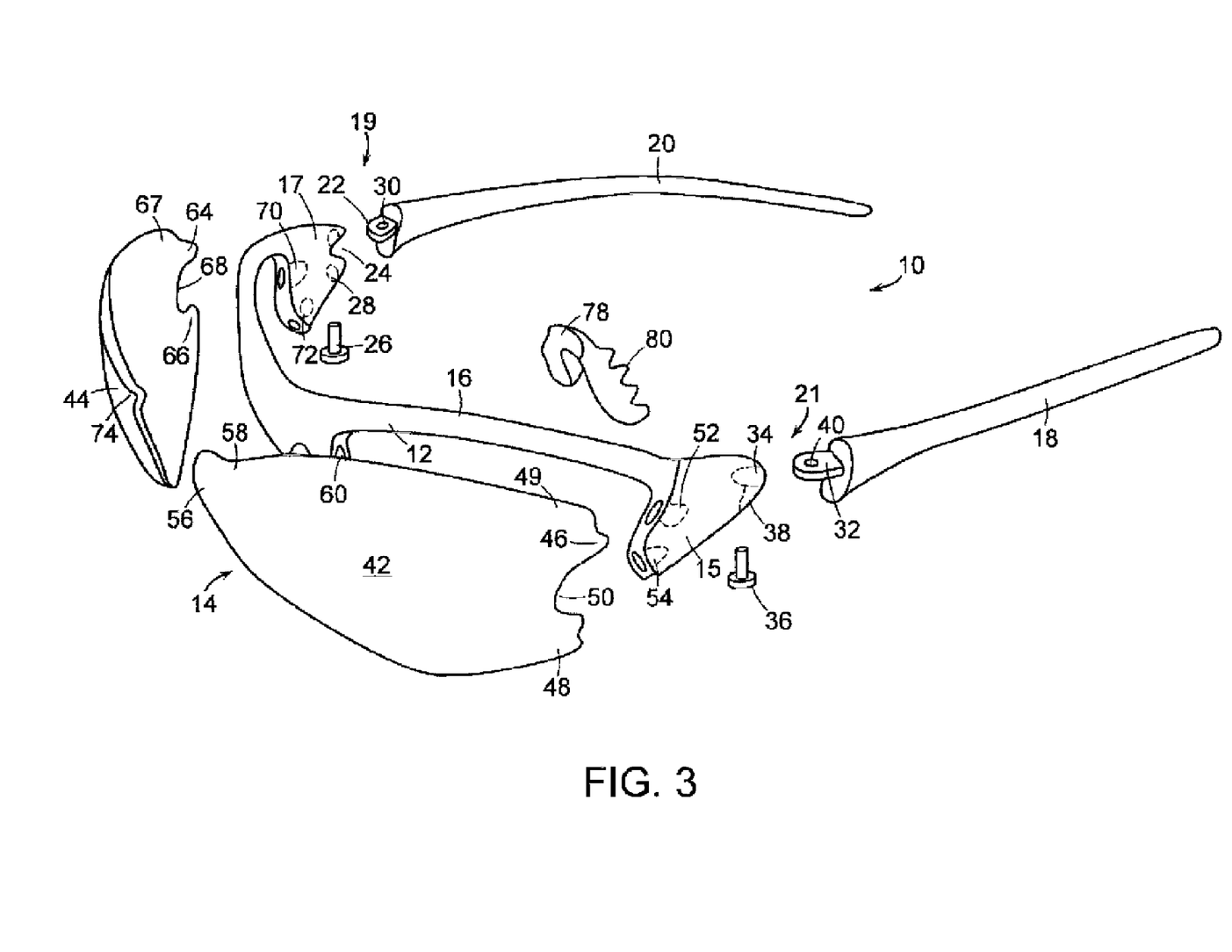
FIG. 3 is a perspective exploded view of the eyewear of FIG. 1.

The present invention may be embodied in various forms. A preferred embodiment of eyewear 10 is shown in FIGS. 1-3. In certain preferred embodiments, eyewear 10 is sunglasses. In particular, the embodiments depicted herein illustrate use of the present invention with performance sunglasses, often used by bicycle riders and runners. However, it is to be appreciated that eyewear 10 is meant to include all types of glasses, including, for example, prescription glasses and safety glasses with clear lenses.

Certain directional terms used herein refer to directions with respect to the wearer of eyewear 10. Thus, the terms outward, outwardly, forward, and forwardly, as used herein, refer to a surface facing away from, or a direction extending away from, the face of a wearer of eyewear 10. The terms inward, inwardly, rear, and rearwardly refer to a surface facing toward, or a direction extending toward, the face of a wearer of eyewear 10. The terms left and right are considered to be with respect to the wearer of eyewear 10. Thus, the left side of eyewear 10 would be to the right as seen in FIG. 2, while the right side of eyewear 10 would be to the left as seen in FIG. 2.

Eyewear 10 includes a frame 12 and a lens 14 secured to frame 12. In certain embodiments, frame 12 includes a central member 16 which may be curved rearwardly in order to match the contour of the forehead of the wearer of eyewear 10. Frame 12 may be formed of a rigid material, for example, a fiber-reinforced material such as a carbon fiber composite, providing a rigid structure and support for lens 14. In other embodiments, frame 12 may be formed of plastic, or a rubber coated core material, such as metal or plastic. Other suitable materials for frame 12 will become readily apparent to those skilled in the art, given the benefit of this disclosure.

Frame 12 includes a left connecting member 15 at the left end of central member 16 and a right connecting member 17 at a right end of central member 16. In the illustrated embodiments, left connecting member 15 and central member 16 are of unitary, that is one-piece, construction with one another. Similarly, right connecting member 17 and central member 16 are of unitary, that is one-piece, construction with one another. It is to be appreciated that in other embodiments, left connecting member 15 and right connecting member 17 may be separate elements secured to central member 16.

A first or left temple arm 18 is secured to left connecting member 15. Similarly, a second or right temple arm 20 is secured to a right connecting member 17. In certain embodiments, left temple arm 18 is pivotally secured to left connecting member 15 and right temple arm 20 is pivotally secured to right connecting member 17. In other embodiments, it is to be appreciated that left temple arm 18 and right temple arm 20 may be rigidly secured to frame 12, or they may be of unitary construction with frame 12.

A hinge 19 pivotally connects right temple arm 20 to right connecting member 17. Hinge 19 includes a tab 22 that extends outwardly from right temple arm 20 and which is received in a slot or recess 24 formed in the right end of central member 16. A fastener such as a screw 26 extends through an aperture 28 formed in central member 16 and an aperture 30 in tab 22, thereby securing tab 22 within recess 24.

Similarly, a hinge 21 pivotally connects left temple arm 18 to left connecting member 15. Hinge 21 includes a tab 32 that extends outwardly from left temple arm 18 and which is received in a recess 34 formed in central member 16. A fastener such as a screw 36 extends through an aperture 38 formed in central member 16 and an aperture 40 in tab 32, thereby securing tab 32 within recess 34. It is to be appreciated that fasteners 26, 36 may be bolts or rivets or any other suitable fastener that will adequately secure tabs 22, 32 to central member 16.

In certain embodiments, as illustrated in FIGS. 1-3, lens 14 is formed of a first or left lens 42, which is secured to a left side of central member 16, and a second or right lens 44, which is secured to a right side of central member 16. A first tab 46 on a left side of left lens 42 is spaced from a second tab 48 on the left side 49 of left lens 42, defining a first recess 50 in left lens 42 therebetween. First tab 46 is removably received in a mating first recess 52 formed in the left end of central member 16, and second tab 48 is removably received in a mating second recess 54 formed in the left end of central member 16. A third tab 56 formed on the right side 58 of left lens 42 is removably received in a mating third recess 60 formed in central member 16. When first, second and third tabs 46, 48, 56 are received in first, second and third recesses 52, 54, 60, respectively, left lens 42 is secured within central member 16 of frame 12.

When first and second tabs 46, 48 of left lens 42 are received in first and second recesses 52, 54, respectively, of central member 16, central member 16 covers only a portion of recess 50 of left lens 42, thereby defining a first venting aperture 62, which is seen most clearly in FIG. 2.

Similarly, a first tab 64 on a right side 67 of right lens 44 is spaced from a second tab 66 on the right side 67 of right lens 44, defining a second recess 68 in right lens 44 therebetween. First tab 64 is removably received in a mating fourth recess 70 formed in the right end of central member 16, and second tab 66 is removably received in a mating fifth recess 72 formed in the right end of central member 16. A third tab 74 formed on the left side of right lens 44 is removably received in a mating sixth recess (not visible) formed in central member 16. When first and second tabs 64, 66 of right lens 44 are received in fourth and fifth recesses 70, 72, respectively, of central member 16, central member 16 covers only a portion of recess 68 of right lens 44, thereby defining a second venting aperture 76, which is seen most clearly in FIG. 2.

Venting apertures 62, 76 provide ventilation through the leftmost edge of left lens 42 and the rightmost edge of right lens 44, respectively, thereby reducing the chance of fogging of eyewear 10, and helping prevent moisture buildup on the eyewear, thereby improving overall vision and enhancing comfort for the wearer. Venting apertures 62, 76 may also provide aeration for the user's eyes, making the user's eyes more comfortable. By positioning venting apertures 62, 76 at the far edges of left and right lenses 42, 44, respectively, the likelihood of impairing the user's vision is advantageously reduced.

At least a portion of the peripheral edge of left lens 42 and right lens 44 are free from frame 12, allowing the tabs of the lenses to be easily removed from the corresponding recesses of the frame. As illustrated in this embodiment, the majority of the peripheral edge along the top and bottom of left lens 42 and right lens 44 is free of frame 12. Thus, it can be seen that left lens 42 and right lens 44 can easily be removed from frame 12, advantageously allowing the lenses to be replaced for various reasons. For example, different lenses for different lighting requirements can be used, or a damaged lens can be replaced.

A nosepiece 78 is secured to central member 16. Nosepiece 78 is an inverted V-shaped member, and has a plurality of rearwardly extending fins 80. Nosepiece 78 may be secured to central member 16 by adhesive or other suitable fastening means.

Figure 4:
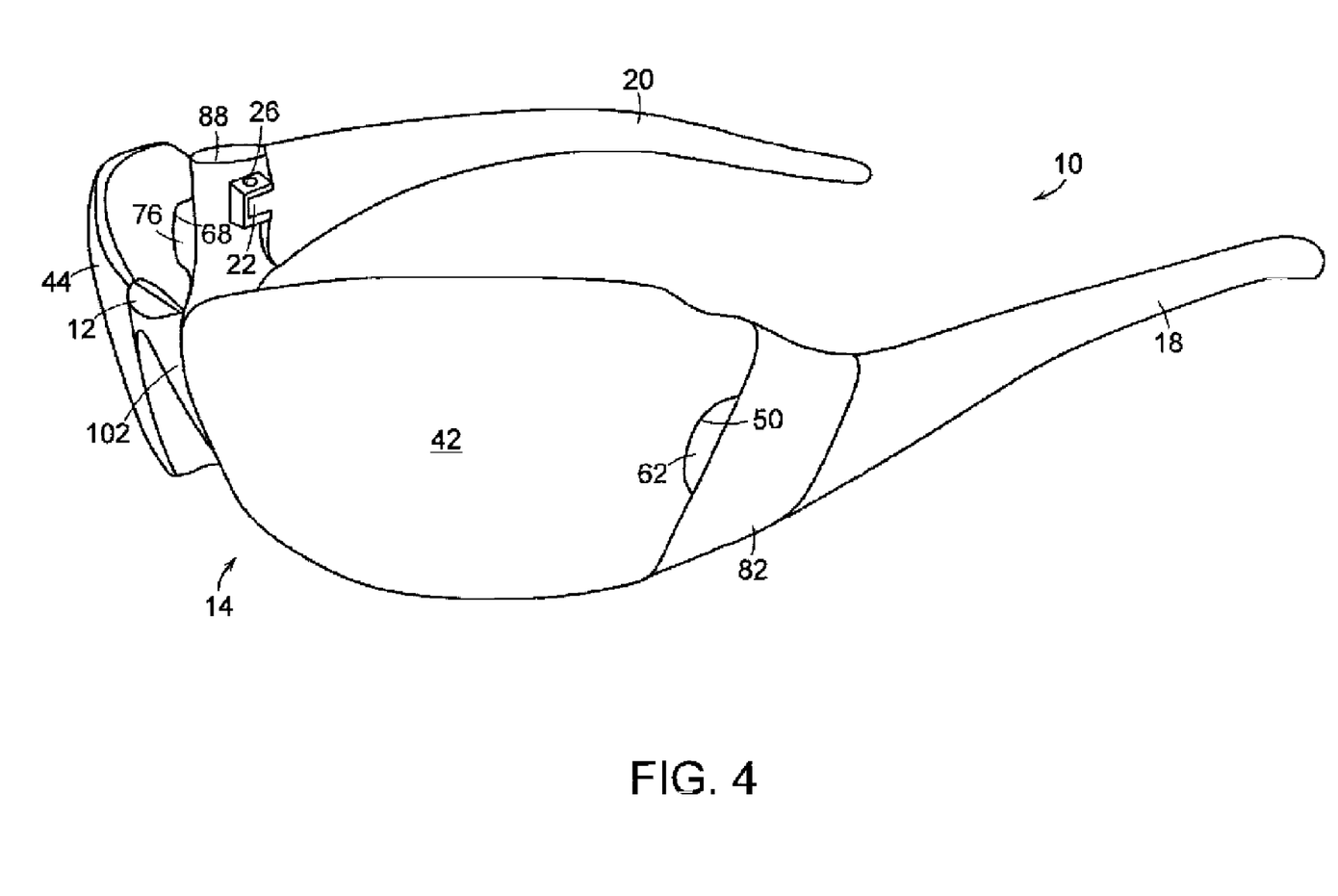
FIG. 4 is a perspective view of another embodiment of eyewear with vents.
Figure 5:
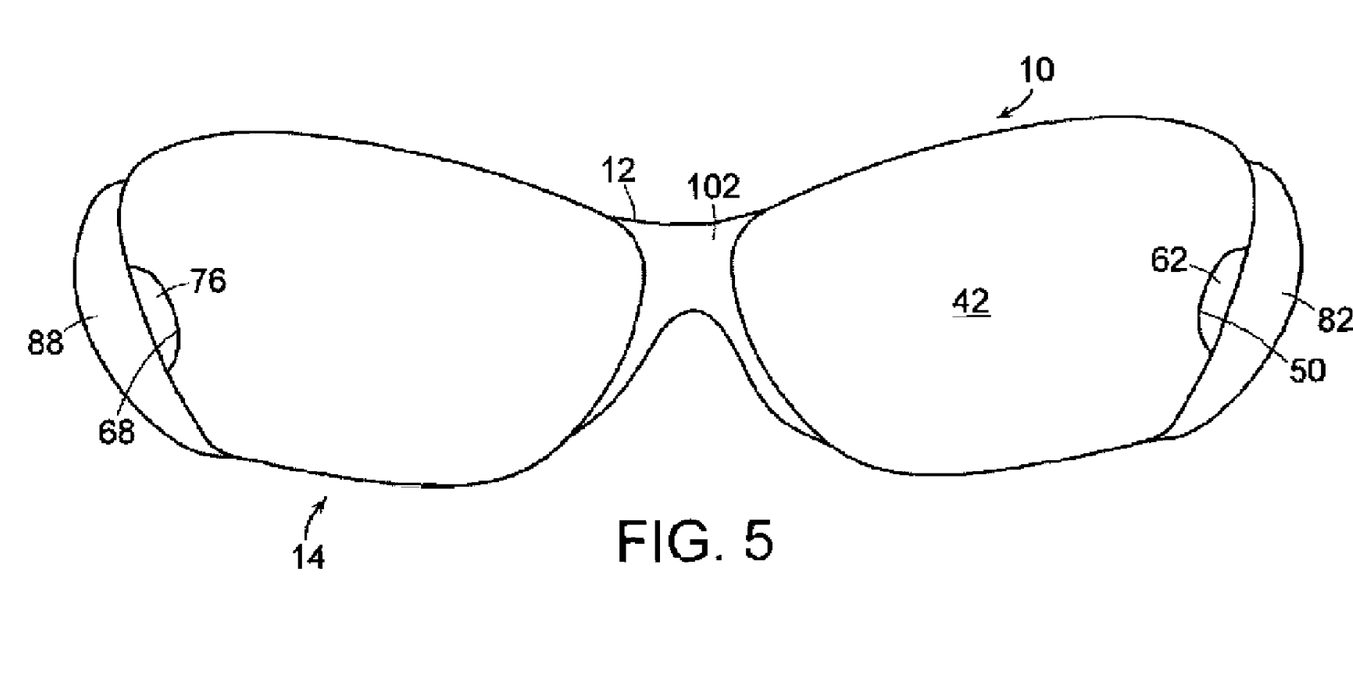
FIG. 5 is a front elevation view of the eyewear of FIG. 4.
Figure 6:
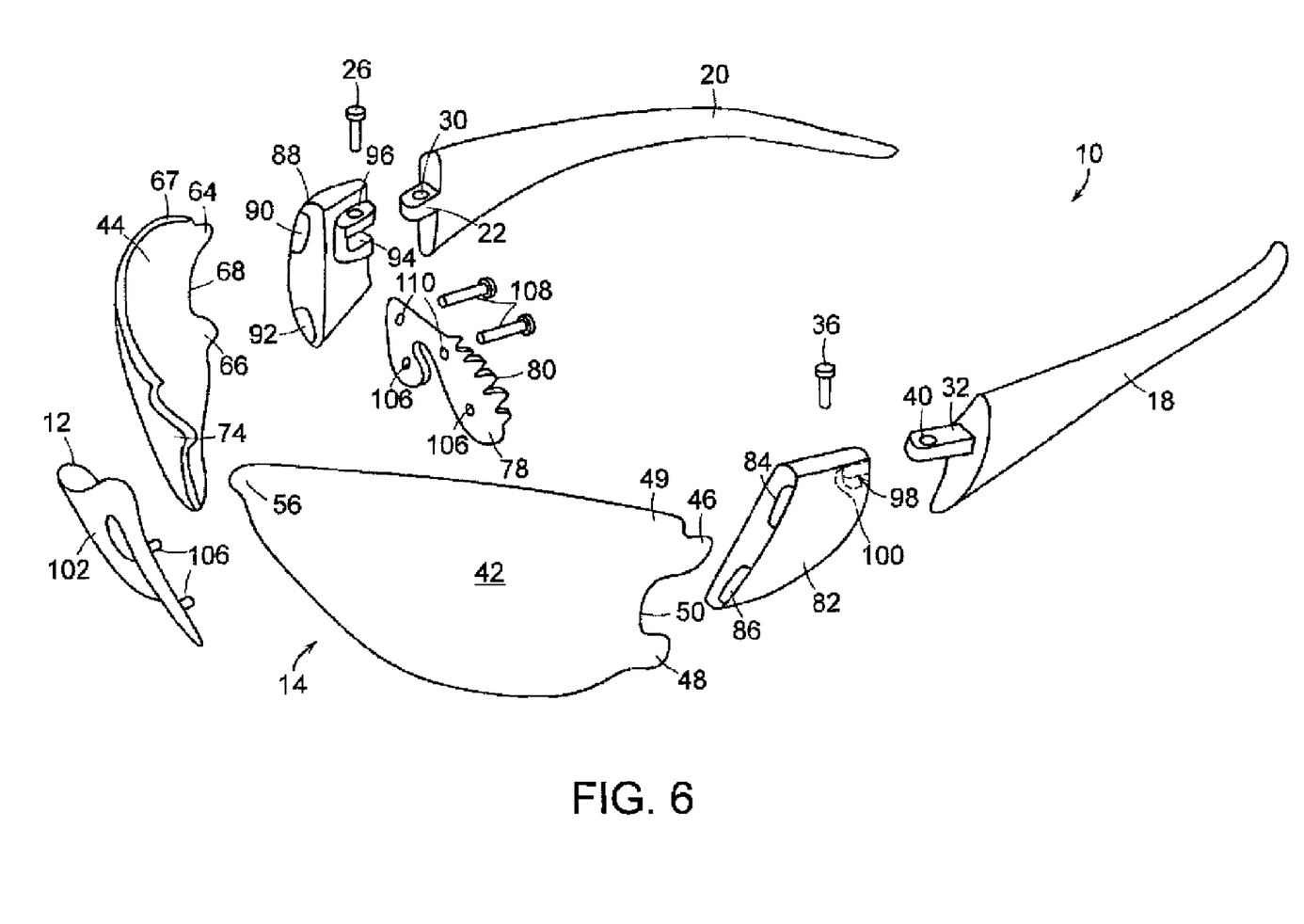
FIG. 6 is a perspective exploded view of the eyewear of FIG. 4.

Another embodiment of eyewear 10 is seen in FIGS. 4-6 in which frame 12 includes a first or left connecting member 82 having a first recess 84 that removably receives first tab 46 of left lens 42 and a second recess 86 that removably receives second tab 48 of left lens 42. When first and second tabs 46, 48 of left lens 42 are received in first and second recesses 84, 86, respectively, of left connecting member 82, left connecting member 82 covers only a portion of recess 50 of left lens 42, thereby defining venting aperture 62, which is seen most clearly in FIG. 5. In certain embodiments, a screw (not shown) may be used to secure left lens 42 to left connecting member 82.

Similarly, a second or right connecting member 88 has a first recess 90 that removably receives first tab 64 of right lens 44 and a second recess 92 that removably receives second tab 66 of right lens 44. When first and second tabs 64, 66 of right lens 44 are received in first and second recesses 90, 92, respectively, of right connecting member 88, right connecting member 88 covers only a portion of recess 68 of right lens 44, thereby defining venting aperture 76, which is seen most clearly in FIG. 5. In certain embodiments, a screw (not shown) may be used to secure right lens 44 to right connecting member 88.

Right connecting member 88 has a recess 94 that receives tab 22 of right temple arm 20. Fastener 26 extends through an aperture 96 formed in right connecting member 88 and aperture 30 in tab 22, thereby pivotally securing tab 22 within recess 94. Similarly, left connecting member 82 has a recess 98 that receives tab 32 of left temple arm 18. Fastener 36 extends through an aperture 100 formed in left connecting member 82 and aperture 40 in tab 32, thereby pivotally securing tab 32 within recess 98.

Frame 12 includes a center member 102 to which nosepiece 78 is secured. A pair of projections 104 extends rearwardly from center member 102, each of which is received in a corresponding recess or aperture 106 that is formed in nosepiece 78. Each of a pair of fasteners such as screws 108 extends through a corresponding aperture 110 formed in nosepiece 78 and is received in an aperture (not shown) in center member 102, thereby securing nosepiece 78 to center member 102, with third tab 56 on the right end of left lens 42 and third tab 74 on the left end of right lens 44 captured therebetween. It is to be appreciated that fasteners 108 may be bolts or rivets or any other suitable fastener that will adequately secure nosepiece 78 to center member 102.

Figure 7:
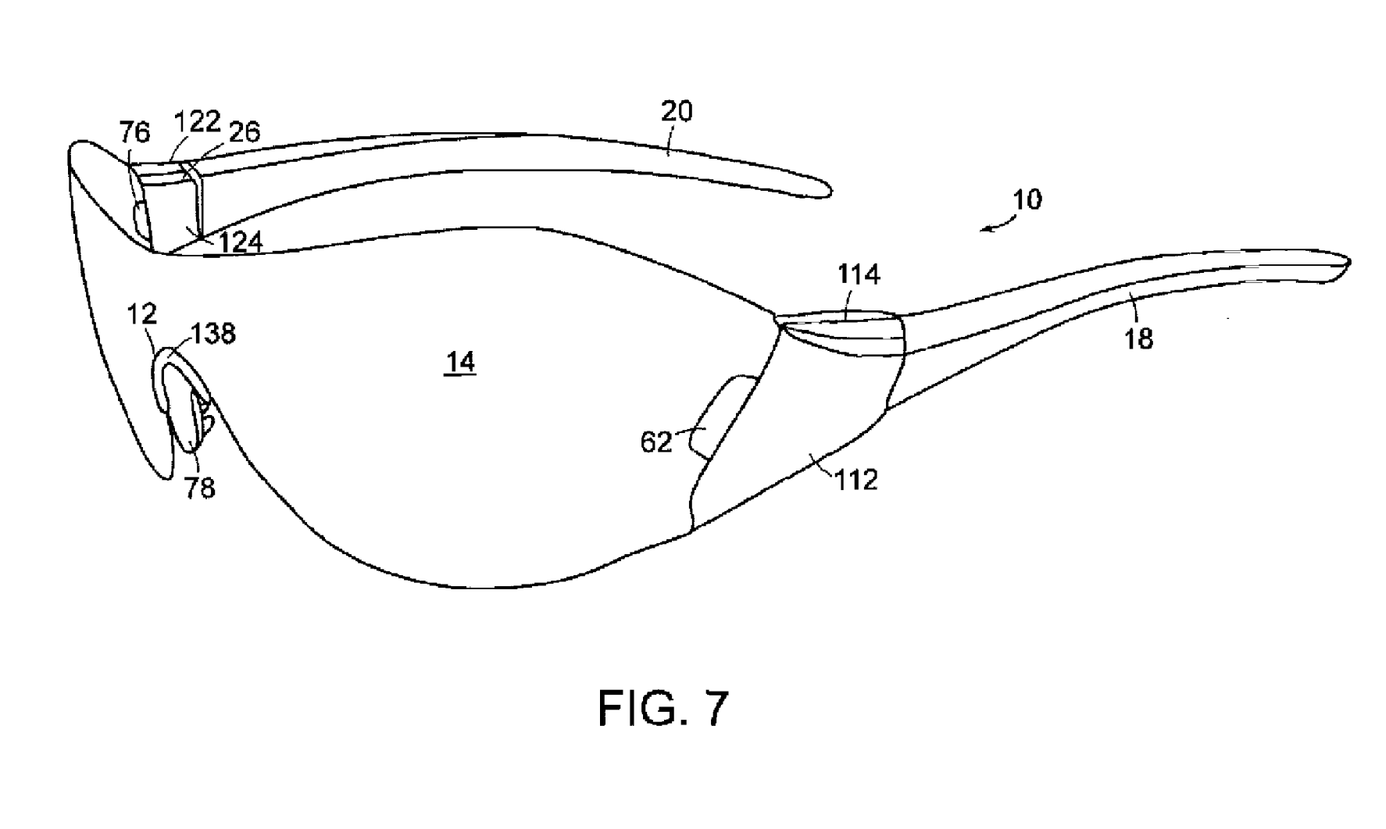
FIG. 7 is a perspective view of a further embodiment of eyewear with vents.
Figure 8:
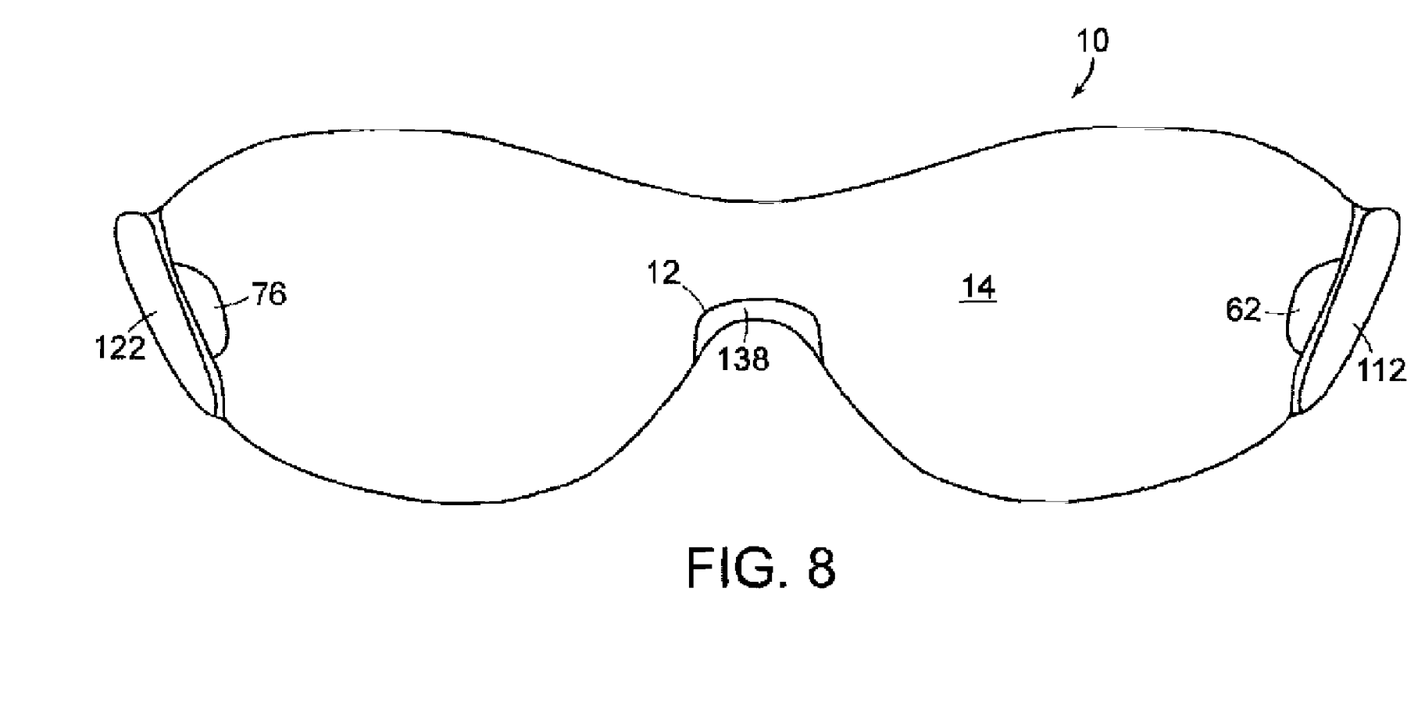
FIG. 8 is a front elevation view of the eyewear of FIG. 7.
Figure 9:
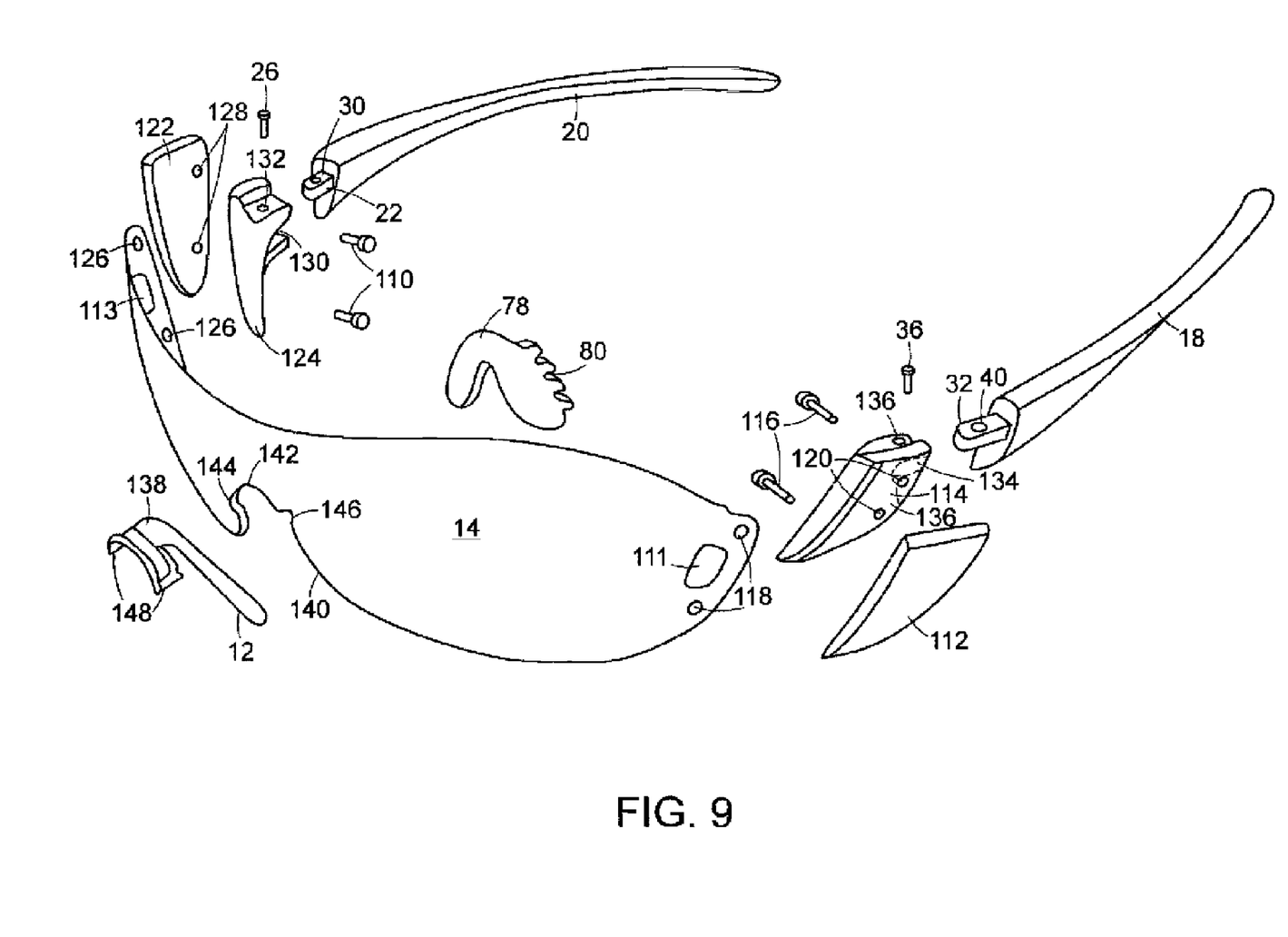
FIG. 9 is a perspective exploded view of the eyewear of FIG. 7.

Another embodiment of eyewear 10 is seen in FIGS. 7-9. Lens 14, in this embodiment, is a one-piece lens. The majority of the peripheral edge of lens 14 is free from frame 12. A first aperture 111 is formed proximate the right edge of lens 14 and a second aperture 113 proximate the left edge of lens 14.

Frame 12 includes a front left portion 112 and a rear left portion 114 secured to front left portion 112 by fasteners such as screws 116. A portion of the left side of lens 14 is captured between front left portion 112 and rear left portion 113. Screws 116 extend through apertures 120 formed in rear left portion 114 and apertures 118 formed in the left side of lens 14, and are received in apertures (not shown) formed in front left portion 112.

Similarly, frame 12 includes a front right portion 122 and a rear right portion 124 secured to front right portion 122 with screws 116. A portion of the right side of lens 14 is captured between front right portion 122 and rear right portion 124. Screws 116 extend through apertures (not shown) in rear right portion 124 and through apertures 126 formed in the right side of lens 14, and are received in apertures 128 formed in front right portion 122.

Rear right portion 124 has a recess 130 that receives tab 22 of right temple arm 20. Fastener 26 extends through an aperture 132 formed in right rear portion 124 and aperture 30 in tab 22, thereby pivotally securing tab 22 within recess 130. Similarly, left rear portion 114 has a recess 134 that receives tab 32 of left temple arm 18. Fastener 36 extends through an aperture 136 formed in left rear portion 114 and aperture 40 in tab 32, thereby pivotally securing tab 32 within recess 134.

Frame 12 includes a center member 138, which is an inverted V-shaped member. An inverted substantially V shaped recess 140 is formed in a lower central portion of lens 14. A closed end 142 of recess 140 is substantially rounded. A first notch 144 is formed on one side of recess 140 and a second notch 146 is formed on an opposed side of recess 140. Horizontal ribs 148 on center member 138 are received in first and second notches 144, 146 in snap-fit fashion. Nosepiece 78 is secured to center member 138 with a snap-fit interference fit, by adhesive, or by other suitable fastening means.

In light of the foregoing disclosure of the invention and description of the preferred embodiments, those skilled in this area of technology will readily understand that various modifications and adaptations can be made without departing from the scope and spirit of the invention. All such modifications and adaptations are intended to be covered by the following claims.

What is claimed is:

1. Eyewear comprising, in combination:
   a frame;
   a left temple arm secured to the frame;
   a right temple arm secured to the frame;
   at least one lens connected to the frame and having a first recess and a second recess formed therein, each of the first and second recesses defining an aperture extending through the at least one lens;
   a first venting aperture defined by the first recess and the frame and being located proximate the left temple arm; and
   a second venting aperture defined by the second recess and the frame and being located proximate the right temple arm, the at least one lens being free of any other apertures other than the first and second venting apertures.

2. The eyewear of claim 1, wherein the at least one lens comprises a first lens and a second lens, the first venting aperture being defined in part by the first lens and the second venting aperture being defined in part by the second lens.

3. The eyewear of claim 1, wherein the at least one lens comprises a first lens having a first pair of tabs and a second lens having a second pair of tabs, the frame including a first pair of recesses proximate the left temple arm and a second pair of recesses proximate the right temple arm, the first pair of tabs being received in the first pair of recesses and the second pair of tabs being received in the second pair of recesses.

4. The eyewear of claim 1, wherein the left and right temple arms are pivotally secured to the frame.

5. The eyewear of claim 1, wherein the right and left temple arms are of unitary construction with the frame.

6. The eyewear of claim 1, wherein the at least one lens comprises:
   a single lens, the frame and the single lens defining the first venting aperture and the second venting aperture.

7. The eyewear of claim 6, wherein a portion of the left side of the lens is removably captured in the frame and a portion of the right side of the lens is removably captured in the frame.

8. The eyewear of claim 6, wherein the frame comprises:
   a front left portion;
   a rear left portion, the left side of the lens being captured between the front and rear left portions;
   a front right portion; and
   a rear right portion, the right side of the lens being captured between the front and rear right portions.

9. The eyewear of claim 8, further comprising a first fastener securing the front and rear left portions to each other and a second fastener securing the front and rear right portions to each other.

10. The eyewear of claim 1, further comprising a nosepiece secured to the frame.

11. The eyewear of claim 10, wherein the nosepiece is an inverted V-shaped member.

12. The eyewear of claim 10, wherein the nosepiece includes a plurality of rearwardly extending fins.

13. The eyewear of claim 1, wherein the frame comprises:
a central member having a left end and a right end;
a left connecting member at the left end, a left side of the at least one lens and the left temple arm being secured to the left connecting member; and
a right connecting member at the right end, a right side of the at least one lens and the right temple arm being secured to the right connecting member.

14. The eyewear of claim 13, wherein the left connecting member and the central member are of unitary construction with one another and the right connecting member and the central member are of unitary construction with one another.

15. The eyewear of claim 13, wherein the left temple arm is pivotally secured to the left connecting member by a first hinge and the right temple arm is pivotally secured to the right connecting member by a second hinge.

16. The eyewear of claim 1, further comprising:
a first pair of recesses formed in a left portion of the frame;
a first pair of tabs extending outwardly from a left edge of the at least one lens and being removably received in the first pair of recesses;
a second pair of recesses formed in a right portion of the frame; and
a second pair of tabs extending outwardly from a right edge of the at least one lens and being removably received in the second pair of recesses.

17. The eyewear of claim 1, further comprising a nosepiece secured to the lens.

18. The eyewear of claim 17, wherein the nosepiece is an inverted V-shaped member.

19. The eyewear of claim 17, wherein the nosepiece includes a plurality of rearwardly extending fins.

20. The eyewear of claim 1, wherein the at least one lens comprises a single lens.

21. The eyewear of claim 1, wherein the at least one lens comprises a right lens and a left lens.

22. Eyewear comprising, in combination:
a frame;
a left temple arm secured to the frame;
a right temple arm secured to the frame;
a lens connected to the frame and having a first recess and a second recess, at least a portion of a peripheral edge of the lens being free of the frame, each of the first and second recesses defining an aperture extending through the at least one lens;
a first venting aperture defined by the first recess and the frame and located proximate the left temple arm; and
a second venting aperture defined by the second recess and the frame and located proximate the right temple arm, the lens being free of any other apertures other than the first and second venting apertures.

23. The eyewear of claim 22, wherein the left and right temple arms are pivotally secured to the frame.

24. The eyewear of claim 22, wherein the right and left temple arms are of unitary construction with the frame.

25. The eyewear of claim 22, wherein the frame comprises:
a front left portion;
a rear left portion, a left side of the lens being captured between the front and rear left portions;
a front right portion; and
a rear right portion, a right side of the lens being captured between the front and rear right portions.

26. The eyewear of claim 25, further comprising a first fastener securing the front and rear left portions to each other and a second fastener securing the front and rear right portions to each other.

27. The eyewear of claim 22, wherein the frame comprises:
a central member comprising a front portion and a nosepiece, a right side of the left lens and a left side of the right lens being captured between the front portion and the nosepiece;
a left connecting member, a left side of the left lens and the left temple arm being secured to the left connecting member; and
a right connecting member, a right side of the right lens and the right temple arm being secured to the right connecting member.

28. The eyewear of claim 27, wherein the nosepiece is an inverted V-shaped member.

29. The eyewear of claim 27, wherein the nosepiece includes a plurality of rearwardly extending fins.

30. The eyewear of claim 22, wherein the lens has a first aperture proximate a left side thereof, the frame and a portion of the first aperture defining the first venting aperture, and a second aperture proximate a right side thereof, the frame and a portion of the second aperture defining the second venting aperture.

31. The eyewear of claim 30, wherein a portion of the left side of the lens is captured in the frame such that a portion of the first aperture is covered by the frame, and a portion of the right side of the lens is captured in the frame such that a portion of the second aperture is covered by the frame.

32. Eyewear comprising, in combination:
a frame;
a left temple arm pivotally secured to the frame;
a right temple arm pivotally secured to the frame;
a left lens comprising:
    a first tab on a left side of the left lens;
    a second tab on the left side of the left lens and spaced from the first tab and defining a first recess in the left lens therebetween; and
    a third tab on the right side of the left lens;
a first recess formed in a left end of the frame, the first tab of the left lens being removably received in the first recess in the frame;
a second recess formed in a left end of the frame, the second tab of the left lens being removably received in the second recess in the frame, a first venting aperture being defined by a combination of the first recess in the left lens, the first and second tabs of the left lens, and the frame;
a third recess formed in the frame, the third tab of the left lens being removably received in the third recess in the frame;
a right lens comprising:
    a first tab on a right side of the right lens;
    a second tab on the right side of the right lens and spaced from the first tab and defining a second recess in the right lens therebetween; and
    a third tab on the left side of the right lens;
a fourth recess formed in a right end of the frame, the first tab of the right lens being removably received in the fourth recess in the frame;

a fifth recess formed in a right end of the frame, the second tab of the right lens being removably received in the fifth recess in the frame, a second venting aperture being defined by a combination of the second recess in the right lens, the first and second tabs of the right lens, and the frame; and a sixth recess formed in the frame, the third tab of the right lens being removably received in the sixth recess in the frame.

33. The eyewear of claim 32, further comprising a nosepiece secured to the frame.

34. The eyewear of claim 33, wherein the nosepiece is an inverted V-shaped member.

35. The eyewear of claim 33, wherein the nosepiece includes a plurality of rearwardly extending fins.

* * * * *